Jan. 5, 1971                L. HUNTER                3,552,024
VEHICLE WHEEL ALIGNMENT DIAGNOSIS CENTER
AND ALIGNMENT APPARATUS THEREFOR

Filed July 24, 1968                       6 Sheets-Sheet 1

INVENTOR
LEE HUNTER
BY Gravely, Lieder & Woodruff
ATTORNEYS

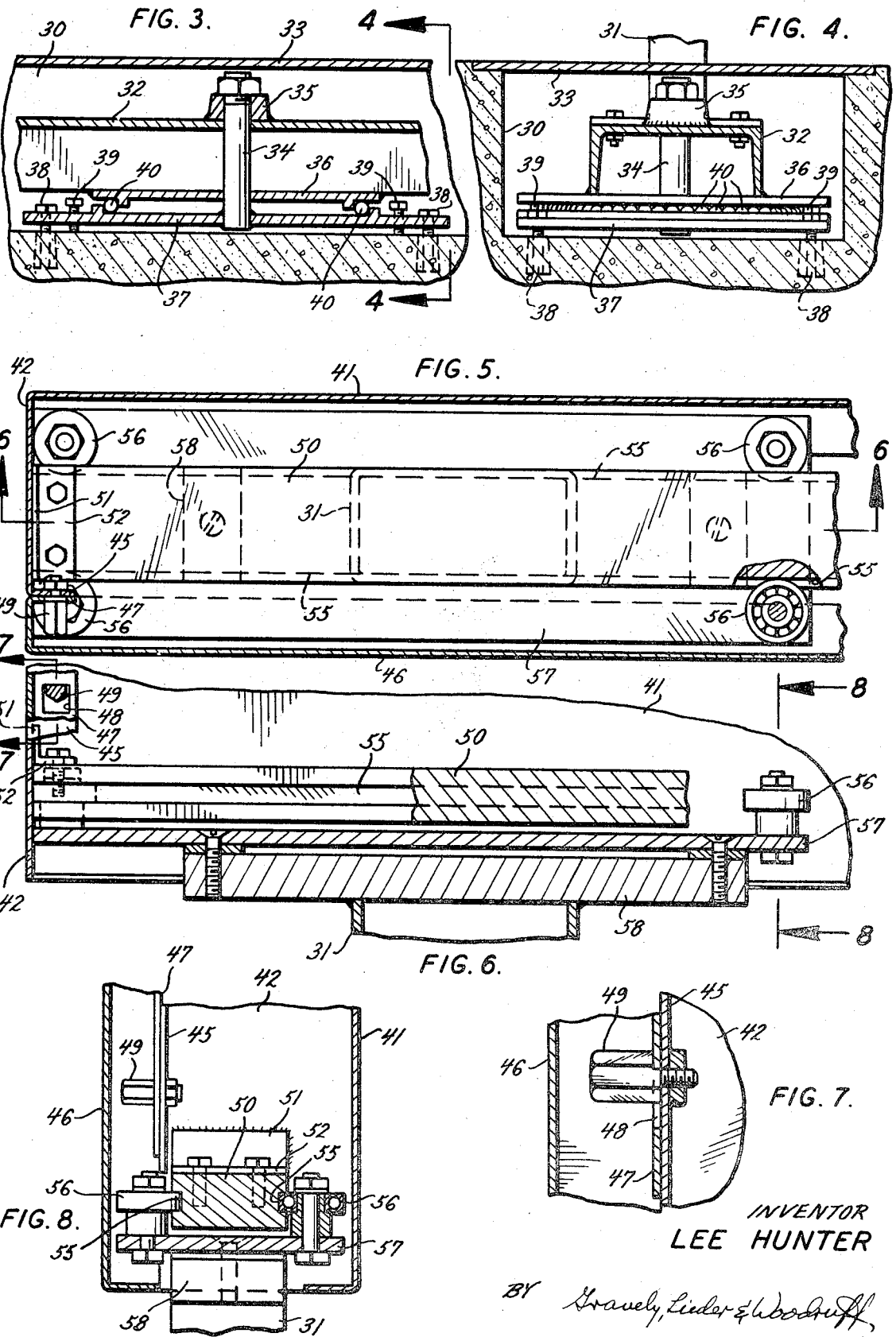

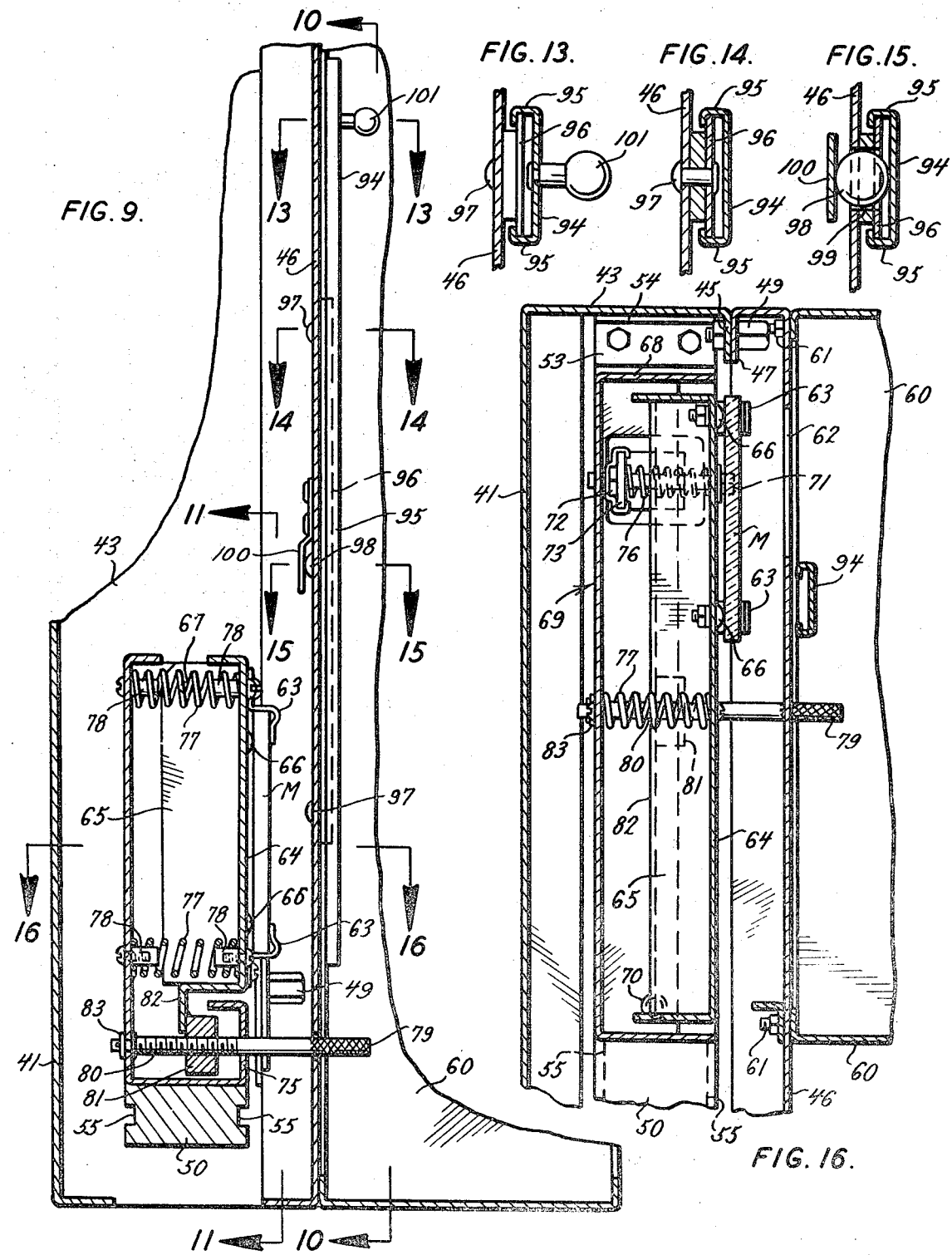

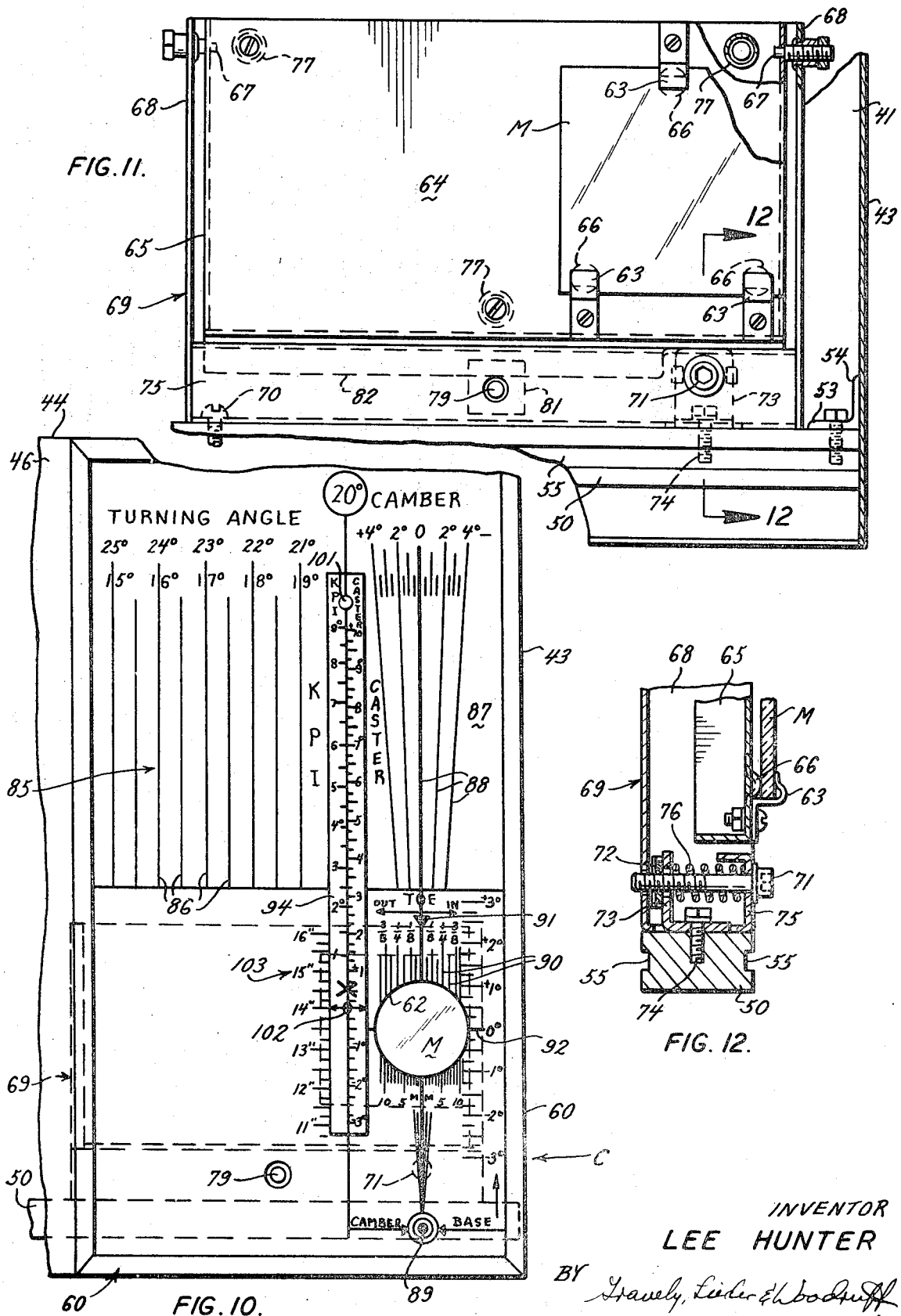

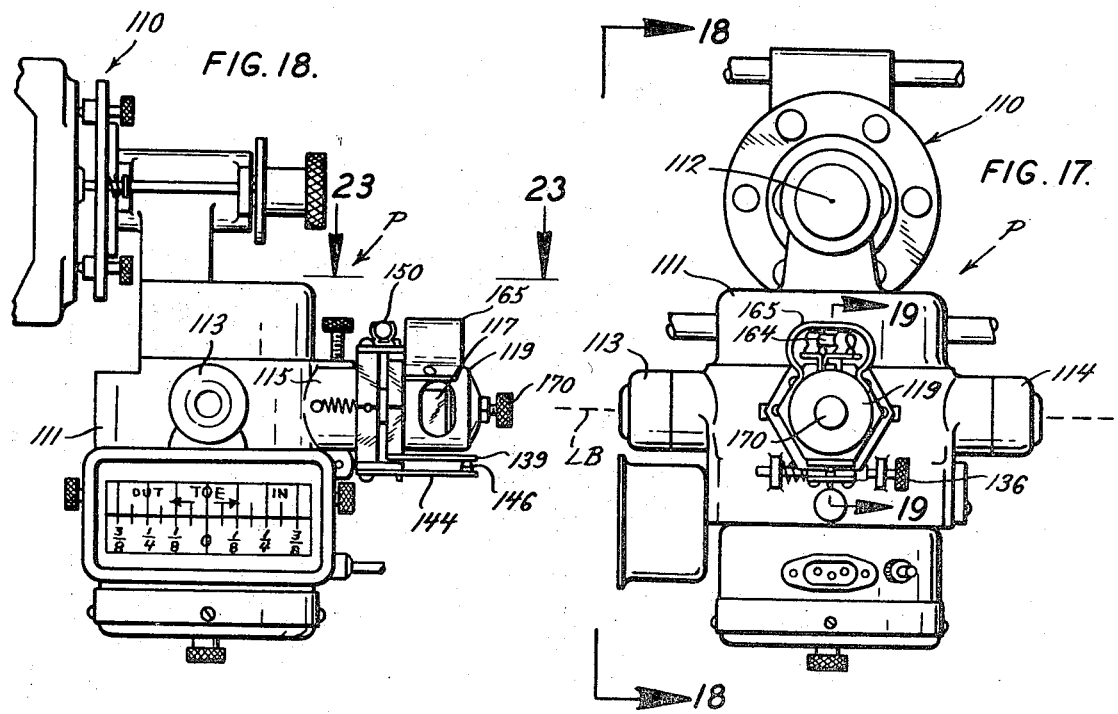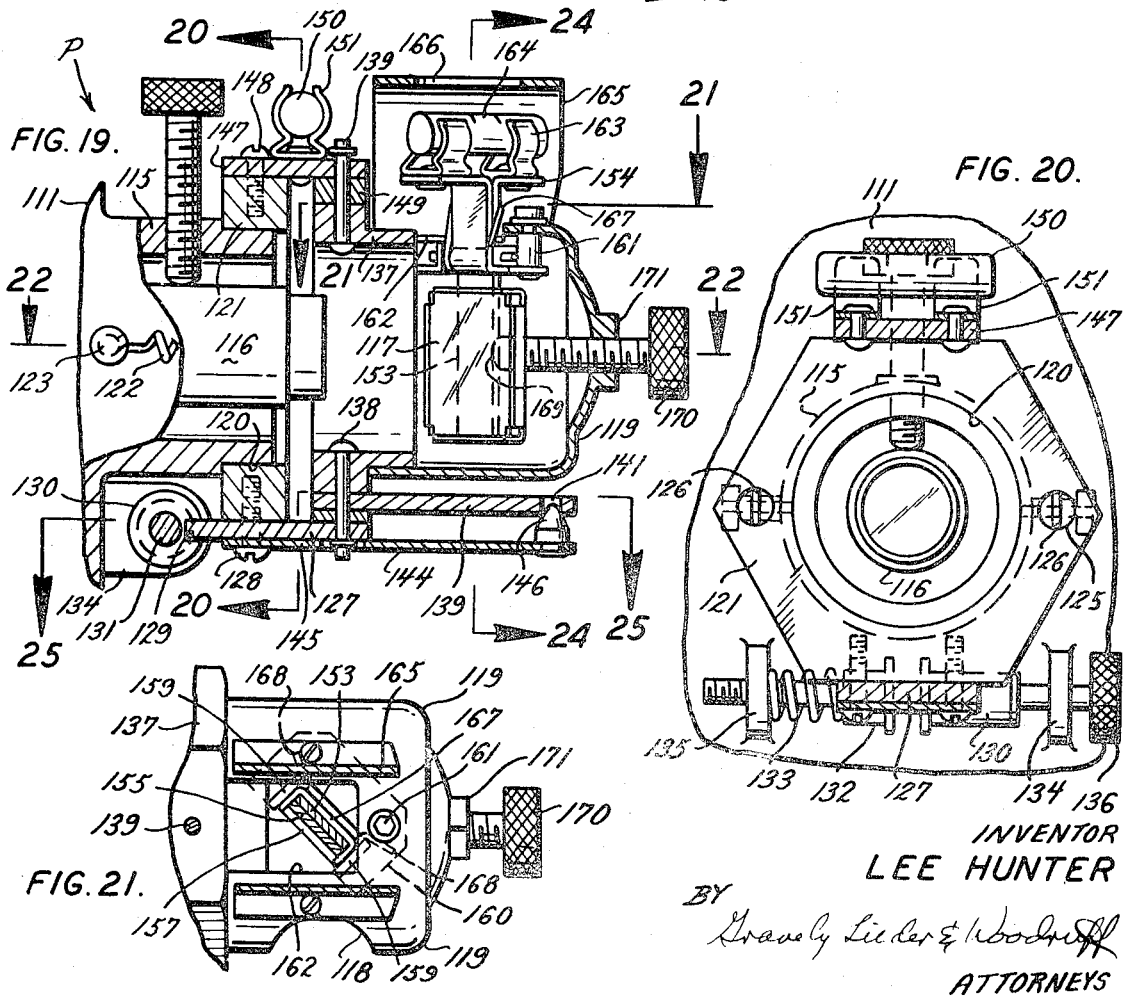

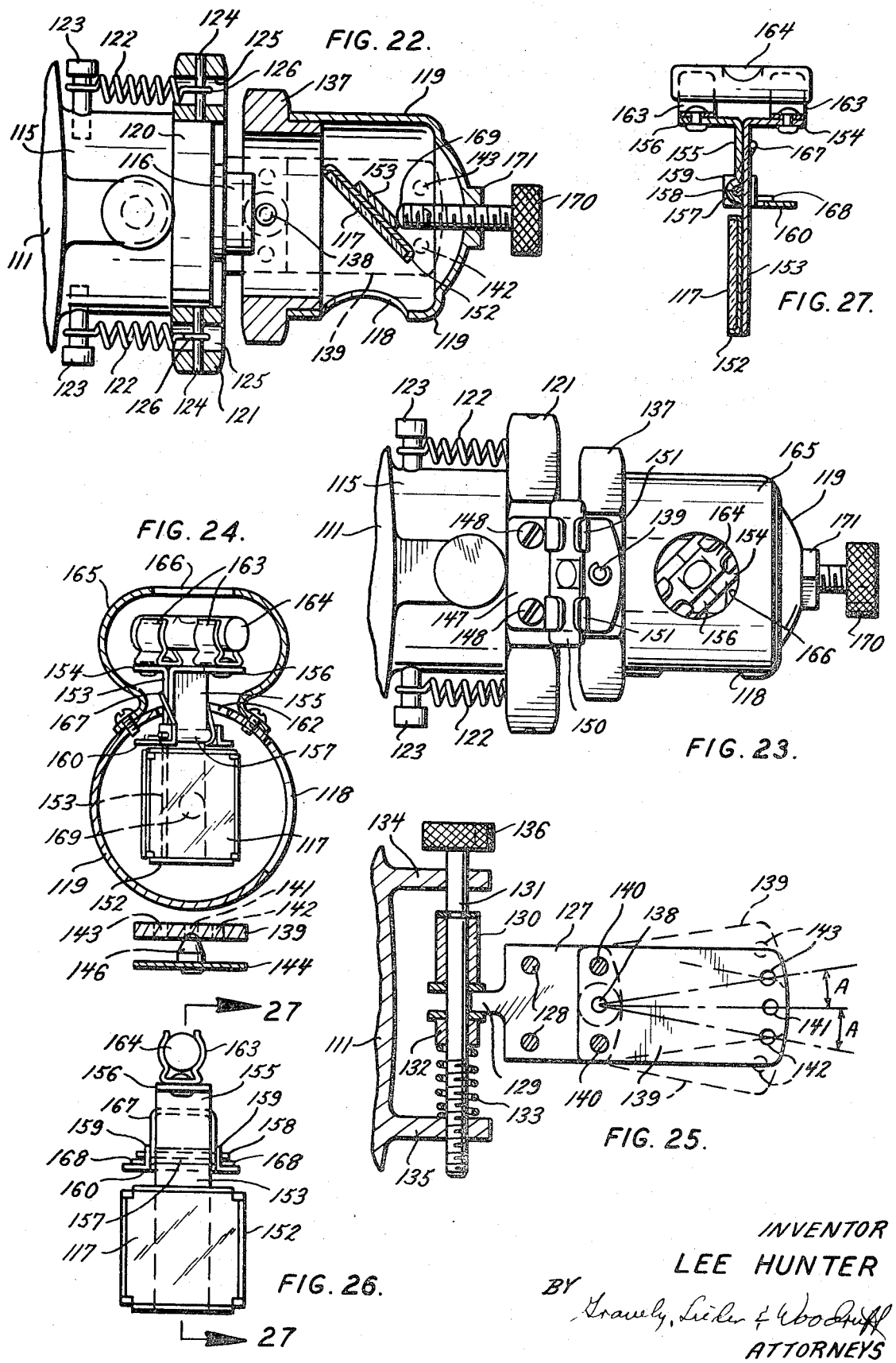

United States Patent Office 3,552,024
Patented Jan. 5, 1971

3,552,024
VEHICLE WHEEL ALIGNMENT DIAGNOSIS
CENTER AND ALIGNMENT APPARATUS
THEREFOR
Lee Hunter, 13501 Ladue Road, Ladue, Mo. 63141
Filed July 24, 1968, Ser. No. 747,268
Int. Cl. G01c 15/12
U.S. Cl. 33—46
14 Claims

ABSTRACT OF THE DISCLOSURE

Apparatus for checking the alignment characteristics of vehicle wheels, such as caster, camber, king-pin inclination, toe and chassis-to-wheel alignment. The apparatus is arranged so it can be used in a drive-through alignment diagnosis center or station equipped with means to locate the vehicle in a predetermined position for checking the geometry of the wheels with light projectors and matching charts.

The apparatus also includes means associated with the light projectors of the alignment components for accommodating the apparatus to drive through stations, and for permitting reduction in the size of cooperating components so that greater flexibility is achieved.

BRIEF STATEMENT OF THE OBJECTS OF THE INVENTION

This invention relates to apparatus for checking the geometry of vehicle wheels and for doing so with components of improved construction.

The problems usually associated with apparatus for checking the alignment geometry of vehicle wheels is that the apparatus is large and bulky and is expensive to make. The size of alignment apparatus is particularly a problem as it restricts the adaptability thereof to only those diagnostic centers and commercial installations having large shop areas which can accommodate the equipment without taking space needed for other operations. Up to now size also has been a problem since it will not easily adapt to drive through shop layouts where vehicle checking is done on a station by station basis and the maneuvering area for the vehicles is limited. Size, of course, has its expense disadvantages over compact apparatus, and this is keenly felt by shops having limited space in which to install the latest equipment for servicing customers vehicles.

A principal object of this invention is to provide alignment apparatus of the above indicated character which will overcome the problems of bulk, cost, and be much more versatile in many ways to be pointed out.

Other objects of the invention are to provide more versatile alignment checking apparatus, to arrange components of such apparatus to fit into a wide range of shop layouts, to improve the convenience of arranging the shop layouts for most economical usage of shop space, to allow for drive through shop layouts, and to provide alignment apparatus which is more compact and easier to use.

A preferred embodiment includes a pair of alignment chart units mounted on a swing beam for ease of squaring up the charts with a vehicle, movably mounted compact charts for each chart unit so that the units may be spaced apart for drive through vehicle alignment checking operations, and improved caster alignment means for the light projector which means allows the alignment charts to be reduced in size and contributes greatly to the compactness of the apparatus.

BRIEF DESCRIPTION OF THE DRAWINGS

The invention in its presently preferred form is shown in the drawings, wherein:

FIG. 3 is a fragmentary sectional view of the pivot assembly for the swing beam supporting the chart assemblies, the view being taken at line 3—3 in FIG. 1;

FIG. 4 is a sectional view taken at line 4—4 in FIG. 3;

FIG. 5 is a fragmentary plan view, partly in section, of the roller support means for the alignment charts, the view being taken at line 5—5 in FIG. 2;

FIG. 6 is a fragmentary sectional detail taken at line 6—6 in FIG. 5;

FIG. 7 is a fragmentary view of a detail seen at line 7—7 in FIG. 6;

FIG. 8 is a further fragmentary sectional view of the support runners taken at line 8—8 in FIG. 6;

FIG. 9 is an enlarged fragmentary sectional view taken at line 9—9 in FIG. 2;

FIG. 10 is a front elevational view of a part of the assembly seen at line 10—10 in FIG. 9;

FIG. 11 is another view of a part of the assembly seen at line 11—11 in FIG. 9;

FIG. 12 is a fragmentary detail view taken at line 12—12 in FIG. 11;

FIGS. 13, 14 and 15 are sectional views taken progressively at lines 13—13, 14—14, and 15—15 in FIG. 9;

FIG. 16 is a fragmentary sectional view seen at line 16—16 in FIG. 9;

FIG. 17 is a fragmentary elevational view of a light projector seen at 17—17 in FIG. 1 showing the improved means for directing the light beam associated with the caster alignment operation;

FIG. 18 is a front elevational view of the light projector assembly as seen at line 18—18 in FIG. 17;

FIG. 19 is a greatly enlarged sectional view of the light beam mounting arrangement as seen at line 19—19 in FIG. 17;

FIG. 20 is a fragmentary view taken at line 20—20 in FIG. 19;

FIG. 21 is a fragmentary sectional detail taken at line 21—21 in FIG. 19;

FIG. 22 is a further fragmentary sectional detail seen at line 22—22 in FIG. 19;

FIG. 23 is yet another fragmentary detail seen at line 23—23 in FIG. 18;

FIG. 24 is a fragmentary sectional view taken at line 24—24 in FIG. 19;

FIG. 25 is a fragmentary view taken at line 25—25 in FIG. 19;

FIG. 26 is a front elevational view of the mirror assembly of the light beam projector; and FIG. 27 is a section view at line 27—27 in FIG. 26.

BRIEF DESCRIPTION OF THE APPARATUS

Figure 2:
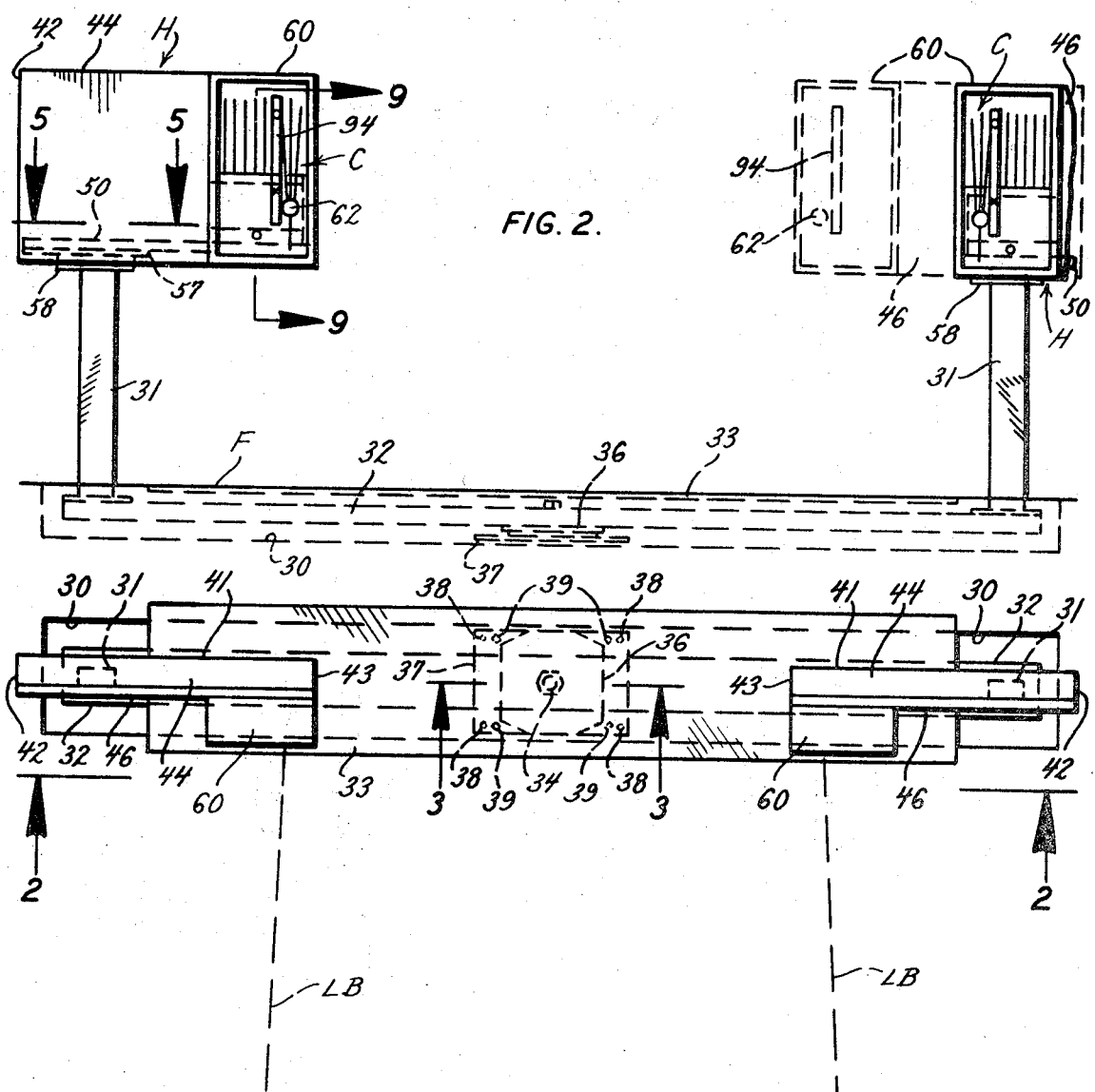
FIG. 2 is a view taken along line 2—2 in FIG. 1.
Figure 1:
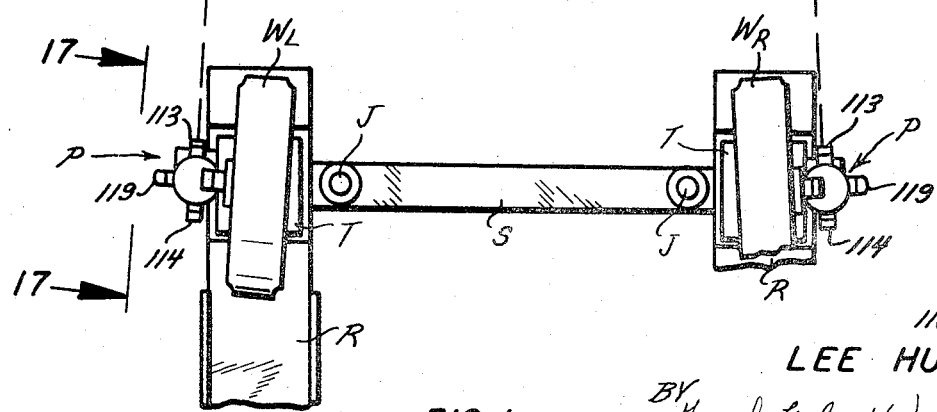
FIG. 1 is a schematic plan view of a part of an alignment shop area in which the apparatus is assembled.

In FIGS. 1 and 2 the apparatus of the present invention is seen to include a trench or recess 30 in the floor F of the alignment shop extending across the path of travel of vehicles to be checked. A vehicle position spaced from the trench 30 is indicated by the wheels W (the suffixes L and R denoting left and right) placed on runways R equipped with turn plates T and a support S for lifting jacks J. The vehicle wheels may be spotted by markings on the shop floor in order to locate the vehicle wheels a desired distance from the position of the alignment charts C, to be described later. Each wheel W is provided with a light projector assembly P by which the position and motion of the wheels W may be checked on alignment charts C (FIGS. 2 and 10) mounted in the housing units H movably connected near the upper ends of columns 31 carried by a swing beam 32 operable in the trench 30, the trench being covered by a heavy gauge plate 33.

The swing beam 32 (FIGS. 3 and 4) is supported at its midsection upon a pivot shaft 34 through the bearing boss 35. The beam is attached to the upper plate 36 of a turn plate assembly. The latter assembly includes a base plate 37 anchored against rotation by fasteners 38 and having levelling screws 39 for the obvious purpose of levelling the pivot 34 so that the swing beam 32 will have a true swing with its plate rolling on the ring of rollers 40 disposed between the base plate 37 and plate 36.

The swing beam 32 allows angular movement of the columns 31 supporting the housing units H so that the charts C in the units may be moved to assume positions in a plane perpendicular to the longitudinal axis of the vehicle. This allows some leeway in bringing the vehicle up to a position in front of the alignment charts.

Referring now to FIGS. 1, 5, 6, 7, 8, 9 and 16 it can be seen that each housing H is essentially the same except for its right hand and left hand construction. A description of the left hand housing assembly will suffice for both and like reference numerals will be applied to each. The left hand housing H includes an open front case having a rear vertical wall 41, an outer end wall 42, an inner end wall 43 (FIGS. 9 and 16) and a top wall 44. These walls are provided with front flanges 45 in a common plane to receive a front cover 46 formed with inturned flanges 47 and key holes 48 (FIG. 7) to engage over holding studs 49 mounted on flanges 45. Thus, the front cover 46 closes in the case to cover up certain components now to be described.

The housing H carries a horizontally directed track bar 50 which is fixed to the case end wall 42 (FIGS. 5, 6 and 8) by an angle bracket having its vertical leg 51 welded to wall 42 (FIG. 8) and its horizontal let 52 bolted to the end of the track bar 50. The opposite end of the track bar (FIG. 16) is bolted to the horizontal leg 53 of an angle bracket, and the vertical leg 54 thereof is welded to the end wall 43. The track bar 50 has grooves 55 (FIGS. 5, 6, and 8) in its opposite edges to run in rollers 56 supported from a base plate 57 connected to the upper end fitting 58 (FIG. 6) of the vertical column 31. The rollers 56 are arranged in pairs near the opposite ends of the base plate 57 to provide stable wide spaced support points for the track bar 50 which moves between the rollers 56. In the left hand housing of FIG. 2 which has been described above, the track bar 50 is seen in broken line of top of the base plate 57 and the column fitting 58. Also, the housing H is seen moved out to the right so the inner portion thereof projects into a position in front of the leftfront wheel $W_L$ (FIG. 1) of the vehicle.

It can be seen in FIGS. 1, 2, 9 and 16 that the cover 46 supports an open front shadow box 60 secured by means 61 (FIG. 16) to the cover 46. The box includes two side walls and top and bottom walls so that it is open at the front and rear to expose the surface of the cover 46 to view so that certain scales and indicia on the cover 46 (FIG. 10) can be seen from the vehicle position. The cover 46 is also formed with an enlarged aperture 62 (FIGS. 2, 10 and 16) for purposes of viewing a mirror M which is part of the light projecting system of the apparatus.

In FIGS. 9, 11, 12 and 16 the mirror M is seen to be held by clips 63 to the vertical wall 64 of a mirror backing frame 65 and against dimples 66. The backing frame 65 is supported on suitable pivot elements 67 at its upper corners so that the wall 64 and mirror M can swing about a horizontal axis. The pivot elements 67 are fixed in the opposite ends 68 of a mirror carriage 69 positioned on the top surface of the track bar (FIG. 11) and held at one end remote from the mirror M by a single pivot element 70 (FIGS. 11 and 16). The carriage is moved fore and aft about the vertical axis of pivot 70 by an adjustment screw 71 engaged in a stationary nut 72 (FIGS. 12 and 16) held by a clip 73 fastened by element 74 to the track bar 50 (FIG. 12). The screw 72 is carried in a flange 75 on the carriage 69 and a spring 76 reacts between the flange 75 and the nut 72 so that when the screw is backed out of the nut the spring will drive the carriage 69 against the screw head.

The backing frame 65 is held firmly in the carriage 69 by vibration damping springs 77 (FIGS. 9 and 11) mounted over suitable nibs 78 so as not to restrict the pivoting movement of the frame 65. The frame 65 is caused to pivot upon turning the exposed knurled end 79 (FIGS. 9 and 16) of a screw shaft 80 engaged in a drive nut 81 secured to the bottom flange 82 on the frame 65. The inner end of the shaft is captured in a grommet 83 so that only rotation is possible, whereby the drive nut 81 is caused to move and pivot the frame 65 about pins 67 for adjusting the position of the mirror M.

Each mirror M in the housings H is disposed behind the aperture 62 in the shadow boxes 60 so as to be visible from the vehicle side. The above described adjustable mountings of the mirrors M enables the apparatus to be trued-up with the mirrors in the same plane and the units squared up to the vehicle axis by the swing beam 32. The adjustment of the two mirrors M into a common plane may be accomplished as disclosed in Hunter Pat. No. 3,159,916, issued Dec. 8, 1964, or by similar gauge means. When once adjusted, the mirrors do not usually require further attention, unless the supporting columns 31 or the housings H are knocked out of position or bent.

Turning now to FIGS. 2, 9, 10 and 11, it can be seen that each shadow box 60 encloses an area of the front wall of cover 46, and this wall area is suitably printed or scribed with alignment charts. For example, in FIG. 10 there is shown a chart area 85 scribed with parallel vertical lines 86 denoting degrees of angular displacement for finding a turning angle for the vehicle wheels $W_R$ and $W_L$. Above the aperture 62 there is a chart area 87 also scribed with divergent lines 88 having a center below the aperture 62 at the base index marker 89. The divergent lines 88 denote the degrees of positive or negative camber angle to either side of a vertical zero camber angle. The chart area immediately adjacent the aperture 62 is scribed with index lines 90 indicative of the amount of wheel toe in or toe out from a zero toe index 91. In the chart area between the aperture 62 and the adjacent margin of the shadow box 60 there is the caster index scale reading positive degrees of angle above the zero index 92 and negative degrees below such index.

In FIGS. 9, 10, 13, 14 and 15 there is shown a vertically slidable scale bar 94 having flanged edges 95 which retain the bar on an elongated track 96 (FIGS. 13, 14 and 15) fixed to the wall of the cover 46 by rivets 97. A friction ball 98 is mounted behind the scale bar 94 in a suitable opening 99 by a retainer clip 100 (FIGS. 9 and 15) to hold the bar in moved position. A handle 101 is provided at the top of the scale. The scale bar 94 is scribed on the left with the angular scale for king pin inclination readings (KPI) from an index mark 102 for zero. The right side of the bar is provided with degrees of angle for caster above and below the same index mark 102. Behind the lower end of the slidable scale bar 94 there is provided an inch scale 103 for purposes of setting of the index mark 102 along the scale at the point on scale 103 which agrees with the heighth of the center of the wheels $W_L$ and $W_R$ above the turn plates T when the vehicle is level and the tires are correctly inflated.

The foregoing portion of the description relates to the apparatus to be installed in an alignment shop for determining and checking wheel alignment characteristics such as caster, camber, toe and king pin inclination. In setting up the apparatus for drive through use, the pit 30 for the swing beam 32 is positioned across the lane of vehicle travel with the columns 31 at each side. The chart housings H are mounted at the top of the columns for movement along the base plate 57 on rollers 56. Thus, the housings H can be moved outwardly to the left and right as viewed in FIG. 2 to retract positions, such as the retract position shown in full line at the right as distinguished from the position shown in full line at the left. The vehicle has room to pass between the columns 31 and easily rolls over the cover plate 33 protecting the swing beam 32 in the pit 30. After a vehicle has passed between the columns 31, the housings H may be moved inwardly toward each other to the full line position shown at the left in FIG. 2 and to the broken outline view at the right so that the shadow box portions 60 thereof with the scales and other indicia therein will line up substantially in front of the respective left and right vehicle wheels as shown in FIG. 1. The vehicle wheels are provided with light projectors P which are suitably mounted on the wheels in a manner shown more particularly in Hunter Pat. No. 3,055,264 issued Sept. 25, 1962. The projectors will then direct the light beams LB forwardly toward the scales in the respective shadow boxes 60. The application of the light projectors shown in FIG. 1 and the various scales shown in FIG. 10 will be carried out in a well known manner to determine alignment characteristics of the vehicle wheels. Its use is partly set forth in Hunter Pat. No. 3,206,862 issued Sept. 21, 1965. It will not be necessary, therefore, to describe in detail the operation of the apparatus since the same has been set forth in the several patents above enumerated.

One of the improved features of the apparatus thus far described is that the various scales and other indicia formerly displayed on the horizontally enlarged chart screens 15 or 30 and 31 in Hunter Pat. 3,055,264 can be significantly condensed so as to utilize less area on the charts contained in the shadow boxes 60. In other words, the information heretofore necessarily displayed on the enlarged charts of the above mentioned Hunter Patents is now condensed and consolidated to fit into the shadow box confines on the respective movable housings H as shown in FIG. 2. This significant condensation of the chart information now makes it possible to mount the charts in the manner shown so that the charts can be moved into working position (FIG. 1) or can be easily moved to a retracted position as shown in the full line view at the right in FIG. 2. Another significant improvement is found in the manner of mounting the chart housings H on a swing beam 32 so that if a vehicle is brought up to the turn plates T with the longitudinal axis at some small angle to the lengthwise axis of the pit 30, the swing beam 32 may be angularly moved so that the housings H will line up substantially in a plane perpendicular to the longitudinal axis of the vehicle.

The accuracy of the present apparatus is assured in the foregoing manner, and since reflective mirrors M are also incorporated therein, provision has been made, as above described, for pivoting the mirror carriage 69 and the supporting frames 65 about a pair of perpendicular axes so that the mirrors can be substantially precisely aligned to lie in the same plane.

The ability to condense the various scales and indicia on the charts C of FIG. 2 is in some measure obtained by reason of the improvements now to be described in connection with FIGS. 17 to 27 and attention will be directed to the several views for an understanding thereof.

The light projector at each of the vehicle wheels will be substantially identical and the description of one thereof will be understood to include both. In FIG. 17 there is shown a fragmentary part of the mounting adaptor 110 which supports the body 111 of the light projector in position to swing about a pivot pin 112 which is substantially coincident with the axis of rotation of the adjacent vehicle wheel. The pivot pin is carried on a run-out device to correct the swing of the projector relative to the vehicle wheel axis so there is substantially no wobble in the light beam LB as the wheel is rotated with the body 111 freely hanging. The body 111 is provided with a lens barrel 113 for projecting the light beam LB forwardly toward the charts C (FIG. 1) and is also provided with a lens barrel 114 for projecting a light beam rearwardly toward the rear wheels of the vehicle for the purpose of chassis to wheel tracking alignment. The body 111 of the projector P is also provided with a projecting tubular boss 115 (FIGS. 18, 19, 22 and 23) which has an axis perpendicular to the axis of the lens barrels 113 and 114 above referred to. The boss 115 encloses light projector 116 which directs a beam of light against a mirror 117 set at approximately a 45° angle to the axis of the light beam (FIG. 22) so as to direct the light beam through an aperture 118 in a mirror casing 119 and toward the chart C.

The mirror casing 119 is adjustably mounted on the projector in the following manner: The outer end of the boss 115 (FIGS. 19, 22 and 23) is stepped to form a seat 120 for a ring collar 121 which is snugly mounted on the seat for rotation. The collar 121 is held in place (FIG. 22) by a pair of tension springs 122 anchored on the boss 115 by pins 123. The outer ends of the springs 122 engage on pins 124 radially directed across apertures 125 in which the spring ends 126 are inserted. The yielding nature of the springs allows a desired degree of rotation or turning of the collar 121 on its seat. The collar 121 is adjusted through a plate 127 attached by screws 128 (FIG. 20), and the plate has a projecting nib 129 (FIG. 25) inserted between a first collar 130 fixed on an adjustment shaft 131 and a loose collar 132 pressed by spring 133 against the nib 129. The shaft is rotatably mounted in a bracket arm 134 extended from the projector body 111, and is threaded into a like bracket arm 135. Turning of the shaft knob 136 will move the nib 129 and displace the plate 127.

The inner end of the casing 119 carries an annular collar 137, and the collar supports radially outwardly directed pivot pins 138 and 139, the pins being diametrally aligned to define a vertical pivot axis. The lower pivot pin 138 engages in the plate 127 so that the plate 127 is caused to pivot on the pin when the adjusting knob 136 is manipulated (FIG. 25). A position control finger 140 is fixed by screws 140a to the collar 137 at the pin 138 and projects outwardly below the mirror casing 119 to an outer end in which are formed three apertures 141, 142, and 143 (FIGS. 19 and 25). A resilient arm 144 is carried at its inner end 145 on the plate 127, and the arm projects outwardly below the position control finger 140 to support a single cam pin 146 which is aligned with the apertures 141, 142 and 143.

The upper pivot pin 139 for the casing 119 engages in a plate 147 fixed to the collar 121 by screws 148, a spacer piece 149 being inserted under the plate 147. The described assembly permits the casing 119 to be angularly positioned about the pivot pins 138 and 139 and retained by the cam pin 146 snap engaging in any one of the apertures 141, 142 or 143. As seen in FIG. 25, the apertures 142 and 143 are spaced from the center aperture 141 a distance such that the angles A are each substantially 10° of arc about the axis of the pivot pin 138.

The angular or rotary adjustment of collar 121 is provided for the purpose of setting the mirror 117 in the casing 119 to a vertical position. This adjustment is detected by a bubble level element 150 mounted in suitable clips 151 fixed on the plate 147.

Turning now to FIGS. 17, 19, 24, 26 and 27, it can be seen that the mirror 117 is carried in a frame 152 supported by the depending finger 153. The upper end 154 of finger 153 is bent at right angles and a bracket 155 is attached thereto with an outwardly bent end 156 positioned in the plane of end 154. The lower end of the bracket 155 is formed into a semi-circular loop 157 to form a bearing for a pivot pin 158 (FIGS. 26 and 27). The pivot pin 158 is supported in upturned ears 159 of a bracket 160, and the bracket is fixed by an element 161 to the casing 119 (FIGS. 19 and 21). The bracket 160 is located such that the bracket 155 and upper end of finger 153 project outwardly through an aperture 162 in the top of the casing 119 (FIG. 24). The outer oppositely bent ends 154 and 156 support suitable clips 163 to mount a bubble level element 164. The level is protected by a guard 165 mounted on the outside of the casing 119, and a level sight opening 166 is provided therein. A spring element 167 engages the finger 153 and the ends 168 rest on the bracket 160 such that the mirror is pivoted in one direction to always rest on the inner end 169 of an adjustment element 170 threadedly mounted in a boss 171 at the axial end of the casing 119 (FIGS. 19 and 22).

The mirror 117 carried in the casing 119 directs a beam of light at the chart C opposite each wheel of the vehicle and this beam is used to determine the caster angle. In prior apparatus it has been the practice to determine the caster readings by swinging the wheels 20° out and observing the light beam on a chart of sufficient size to pick up the beam. This practice has required large charts which have the objections above noted. With the improved means of FIGS. 17, 18 and 19 it is no longer necessary to have large charts because the angular adjustment now provided by the control arm 140 and cam pin 146 allows the identical reading to be obtained with a reduced chart and without reducing the wheel turn to less than 20°. When performing the caster measurements the wheel is adjusted in its straight ahead position so that the light beam from the angular mirror 117 is at the index 102 (FIG. 10) on the caster scale of scale bar 94. The casing 110 is then pivoted about pins 138 and 139 to one of the apertures 142 and 143, depending on which wheel is being observed, so that it reduces the effective wheel swing out angle of 20° to about 10°. Thus it is possible to greatly condense the charts C without affecting the accuracy of the results. When a wheel is swung out 20° the casing 119 on that wheel light projector P is turned in or back 10° as dictated by the cam pin 146 snap fitting into the proper aperture 142 or 143, as required. The improved angular adjustment for casing 119 is used when determining caster readings, king-pin inclination and turning angle. Camber and toe readings are obtained when using the light beam LB from the lens barrel 113, and wheel tracking readings are obtained with the lens barrel 114.

The vehicle wheel alignment measuring apparatus described in connection with FIGS. 1, 2, 10 and 19 sets forth the important features of the present invention. The manner of its use should now be understood. While a preferred embodiment has been shown and described it is to be understood that changes and modifications in some or all of the components may be made.

What is claimed is:

1. In vehicle wheel alignment diagnosis center the combination of a vehicle lane, alignment charts spaced from each other and located at a predetermined distance ahead of the vehicle, means operably supporting said charts for movement into positions substantially perpendicular to the vehicle lengthwise axis including a swing beam, a central pivot support for said beam, and columns on said beam connected to said alignment charts, and other means mounting said alignment charts on said columns for movement between positions extended in front of and substantially aligned with the vehicle wheel and other positions retracted therefrom to increase the spacing therebetween for passage of the vehicle axially between said charts.

2. The combination of claim 1 in which each alignment chart includes a housing having a cover thereon formed with an aperture, a mirror movably mounted in said housing behind said cover aperture and visible therethrough frame means carried by said housing in position to circumscribe a predetermined area on said cover, and alignment indicia on said area.

3. In vehicle wheel alignment apparatus, a vehicle wheel, means locating said wheel in a predetermined position, chart means spaced from said wheel, a light beam projector mounted on said wheel and providing an opening for the projection of a light beam, the improvement of: a casing; means operably mounting said casing on said casing on said projector in front of said opening; and a mirror element mounted in said casing to intercept the light beam from the projector and reflect it in a different direction out of said casing; said casing mounting means comprising first means movable in rotation relative to said projector opening about an axis which is coincident with the light beam axis, second means providing a hinge axis directed normal to and intersecting said axis of rotation, and third means operably engaged with said casing to selectively hold said casing in one of a plurality of positions of movement about said hinge axis.

4. In vehicle wheel alignment apparatus, a vehicle wheel, means locating said wheel in a predetermined position, chart means spaced from said wheel, a light beam projector mounted on said wheel, a casing pivotally carried on said projector for movement to one side at least of a neutral position, a mirror operatively mounted in said casing to direct a light beam upon said chart means with said wheel in a straight ahead alignment and said casing in said neutral position, movement of said wheel angularly from its predetermined position causing said light beam to pass off said chart means, and position control means adjacent said casing to fix the casing in pivoted position at said one side of the neutral position to bring the light beam within the limits of said chart means, said position control means including a first arm pivotally movable with said casing, a second arm fixed on said projector movable relative to and adjacent said first arm, one of said arms having at least a pair of spaced apertures therein, and cam pin means on the other of said arms directed to seat in one of said apertures to retain said casing in position corresponding to the relative position of said arms.

5. The apparatus of claim 3 in which said casing is also rotatably carried on said projector, means is operably connected between said projector and casing to rotate said casing on said projector, and means is mounted on said casing to visually determine the rotational movement of said casing.

6. The apparatus of claim 3 in which a collar rotatably carried on said projector is interposed between said projector and casing, said casing being pivotally connected to said interposed collar, and means is operably connected between said collar and projector to rotate said collar.

7. Vehicle alignment diagnosis apparatus for installation on a shop floor in a vehicle drive-through lane, said apparatus comprising means in the lane locating vehicle wheels for alignment diagnosis, a beam operably supported in the shop floor to extend across the lane and pivot in a horizontal plane, column means extending upwardly above the shop floor and carried by said beams at each side of the lane, said beam and columns being spaced ahead of said vehicle locating means, and alignment diagnosis units carried by said columns above the shop floor, each unit operably mounted to project into the vehicle lane substantially opposite a vehicle wheel and to retract from the vehicle lane for passage therebetween of a vehicle.

8. Vehicle wheel alignment diagnosis apparatus, located adjacent a surface defining a lane for vehicle movement, said apparatus comprising means in said lane to locate vehicle wheels in positions preparatory to alignment thereof, a pair of alignment housing units spaced a predetermined distance in front of the vehicle wheels and spaced from each other a distance greater than the vehicle width, each of said units including alignment chart means for extension into the vehicle lane to a position substantially in front of a vehicle wheel, means interconnecting said housing units to permit conjoint positioning of said units and chart means therein substantially perpendicular to the straight ahead location of the vehicle wheels, and support means below the surface of the lane operably mounting said interconnecting means.

9. In the apparatus of claim 8 in which said interconnecting means for said housing units includes a beam movable in a horizontal plane, vertical columns extending upwardly from spaced locations on said beam, and motion limiting means carried by the upper end of each vertical column, each of said motion limiting means operably engaging one of said alignment chart means to limit the extension thereof into the vehicle lane.

10. Vehicle wheel alignment diagnosis apparatus located adjacent a shop floor in a vehicle drive-through lane, said apparatus comprising vehicle wheel supporting means in said lane, said floor having a recess therein extending across the drive-through lane and spaced from said wheel supporting means, an elongated swing beam operatively mounted in said recess to pivot in a plane substantially parallel with the shop floor, column members projecting vertically from adjacent opposite ends of said swing beam, housings adjacent the upper ends of said column members, rollers and tracks operatively connecting each housing to a column member for movement of said housing horizontally between positions projecting into the drive-through lane substantially in front of the vehicle wheels and retracted from the drive-through lane to pass a vehicle therebetween, alignment diagnosis means carried by said housings, and cooperating light projectors operable to trace the movement of the vehicle wheels upon said alignment diagnosis means in said projecting positions.

11. The apparatus of claim 10 wherein said rollers are carried by said column members and said tracks are carried by said housings in position to determine the limits of said projecting and retracted positions of said housings.

12. A vehicle wheel alignment diagnosis apparatus comprising a swing member operably mounted for movement in a substantially horizontal plane and having a length greater than the tread width of vehicle wheels to be diagnosed for alignment characteristics, a housing unit adjacent each end portion of said swing member vertically above the horizontal plane of movement, means operatively connecting each housing unit and said swing member for movement of said housing units toward and away from each other and for simultaneous movement with said swing member, said housing units both being disposed substantially in a vertical plane intercepting said swing member, and wheel alignment diagnosis chart means carried by each housing unit.

13. In a light beam projector for diagnosing wheel alignment caster characteristics and having a body with a light projector therein directed to emit a light beam from said body along an initial generally horizontal line, the improvement of a light beam directing mirror, means operably mounting said mirror in the axis of said light beam from said light projector, said means being connected to the body to pivot about an axis which intersects the axis of said light beam and is swingable to either side of the light beam axis to position said mirror in different positions displaced from its initial position in front of said light beam to redirect the light beam at an angle to its initial direction, and position fixing means cooperating with said mounting means to retain said mirror in a position displaced to either side of its first position to hold the line of the redirected light emission.

14. The light beam projector set forth in claim 13 wherein said operable mounting means includes means to support said mirror for rotation about said initial generally horizontal line of light emission, and means connected to said rotary support to indicate attainment of a predetermined rotated position of said mirror.

References Cited

UNITED STATES PATENTS

| 1,791,803 | 2/1931 | Creagmile et al. | 33—203.15X |
| 2,197,487 | 4/1940 | Smalley | 33—46.(2H) |
| 3,055,264 | 9/1962 | Hunter | 33—46.(2W) |
| 3,091,862 | 6/1963 | MacMillan | 33—46.(2W) |
| 3,206,862 | 9/1965 | Hunter | 33—46.(2W) |
| 3,288,020 | 11/1966 | Lill | 33—46.(2W) |

FOREIGN PATENTS

| 3,206,862 | 9/1965 | Hunter | 33—46.(2W) |

WILLIAM D. MARTIN, JR., Primary Examiner

U.S. Cl. X.R.

33—203.12

PO-1050
(5/69)

UNITED STATES PATENT OFFICE
CERTIFICATE OF CORRECTION

Patent No. 3,552,024      Dated January 5, 1971

Inventor(s)    Lee Hunter

It is certified that error appears in the above-identified patent and that said Letters Patent are hereby corrected as shown below:

Col. 3, line 17, after "may", "bemoved" should be written "be moved".

Col. 7, line 30, after "casing", the numeral 110 should read "119".

Col. 7, line 31, after the numeral "142" and before "143", "and" should read -- "or".

Col. 8, line 4, the redundant phrase "said casing on at the beginning of the line should be deleted.

Col. 10, line 39, under "references Cited", sub-heading "Foreign Patents" the U. S. patent 3,206,862 Hunter, should be deleted from this classification and the cited Australian patent should be listed as follows:
"218,007 Australia 1/1957 Marteil; Cl.33, Sub-Cl. 46

Signed and sealed this 1st day of June 1971.

(SEAL)
Attest:

EDWARD M. FLETCHER, JR.            WILLIAM E. SCHUYLER, JR.
Attesting Officer                 Commissioner of Patents